(12) United States Patent
Dowling

(10) Patent No.: US 7,373,128 B2
(45) Date of Patent: May 13, 2008

(54) INTER-CELLULAR INTERFERENCE CANCELLATION

(75) Inventor: Martin J. Dowling, Plymouth Meeting, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 600 days.

(21) Appl. No.: 10/735,936

(22) Filed: Dec. 15, 2003

(65) Prior Publication Data

US 2005/0130592 A1 Jun. 16, 2005

(51) Int. Cl.
*H04B 1/10* (2006.01)
(52) U.S. Cl. .................................. 455/296; 455/443
(58) Field of Classification Search ............ 455/205, 455/210, 293, 295, 337, 1, 63.1, 278.1, 422, 455/296, 63, 422.1, 443, 444, 33.1, 570, 455/284; 375/335, 150, 148, 346, 348, 144; 370/335, 342, 334, 268, 269, 286, 289

See application file for complete search history.

(56) References Cited

U.S. PATENT DOCUMENTS

2002/0163896 A1* 11/2002 Hiramatsu ................ 370/335
2003/0035469 A1*  2/2003 Frank et al. .............. 375/150
2003/0128679 A1*  7/2003 Ishiguro et al. .......... 370/335

OTHER PUBLICATIONS

Widrow, Bernard et al, "Adaptive Noise Canceling: Principles and Applications," Proc. IEEE, vol. 63, No. 12, pp. 1692-1716, Dec. 1975.

* cited by examiner

*Primary Examiner*—Tu X. Nguyen
(74) *Attorney, Agent, or Firm*—Volpe and Koenig, P.C.

(57) ABSTRACT

With respect to a first wireless transmit/receive unit (WTRU), at least one WTRU near the periphery of other cells is determined. Out of the at least one WTRU near the periphery, at least one WTRU nearby that WTRU is determined. The first WTRU codes are provided of the at least one nearby WTRU. A contribution of the at least one nearby WTRU is canceled from a received signal at a first WTRU, producing an interference canceled signal. Data of the first WTRU is detected from the interference canceled signal.

3 Claims, 3 Drawing Sheets

INTER-CELLULAR INTERFERENCE CANCELLATION

FIELD OF INVENTION

This invention generally relates to wireless communication systems. In particular, the invention relates to cross cell interference reduction in such systems.

BACKGROUND

Cross cell interference is a problem in wireless communication systems. FIG. 1 is an illustration of cross cell interference. As illustrated, a wireless transmit/receive unit (WTRU) $24_1$ is located at the periphery of cell 1 $26_1$ and another WTRU $24_2$ is located near that WTRU $24_1$ at the periphery of another cell, cell 2 $26_2$. The WTRU $24_1$ of cell 1 $26_1$ transmits an uplink communication U1 to its base station $20_1$ and the WTRU $24_2$ of cell 2 $26_2$ is receiving a downlink communication, D2, from its base station $20_2$. If the uplink communication U1 and the downlink communication D2 are sent in the same spectrum and at the same time, the uplink communication U1 interferes with the downlink communication D2's reception. Typically, to overcome the interference in its downlink communications, the WTRU $24_2$ will request an increase in transmission power from its base station $20_2$. The increase in transmission power results in increased interference to other WTRUs in and outside its cell $26_2$.

An alternative method of link adaptation is adaptive modulation and coding (AM&C), in which coding and modulation are adjusted to reduce the information data rate in the presence of inter-cellular interference. AM&C decreases the data throughput in the affected WTRU.

In many wireless communication systems, techniques for reducing interference within a cell are employed. Some of these approaches include successive interference cancellers (SICs), parallel interference cancellers (PICs) and multi-user detectors (MUDs). Although these techniques are effective at canceling the intra-cell interference, they treat inter-cell interference as noise.

Accordingly, it is desirable to reduce inter-cell interference.

SUMMARY

With respect to a first wireless transmit/receive unit (WTRU), at least one WTRU near the periphery of other cells is determined. Out of the at least one WTRU near the periphery, at least one WTRU nearby that WTRU is determined. The first WTRU codes are provided of the at least one nearby WTRU. A contribution of the at least one nearby WTRU is canceled from a received signal at a first WTRU, producing an interference canceled signal. Data of the first WTRU is detected from the interference canceled signal.

BRIEF DESCRIPTION OF THE DRAWING(S)

DETAILED DESCRIPTION OF THE PREFERRED EMBODIMENT(S)

Although the preferred embodiments are described in conjunction with a code division multiple access communication system, the embodiments are applicable to other wireless communication systems where there is an overlap in the used spectrum between cells. Hereafter, a WTRU 24 includes but is not limited to a user equipment, mobile station, fixed or mobile subscriber unit, pager, or any other type of device capable of operating in a wireless environment. When referred to hereafter, a base station 20 includes but is not limited to a base station, Node-B, site controller, access point or other interfacing device in a wireless environment.

Figure 1:
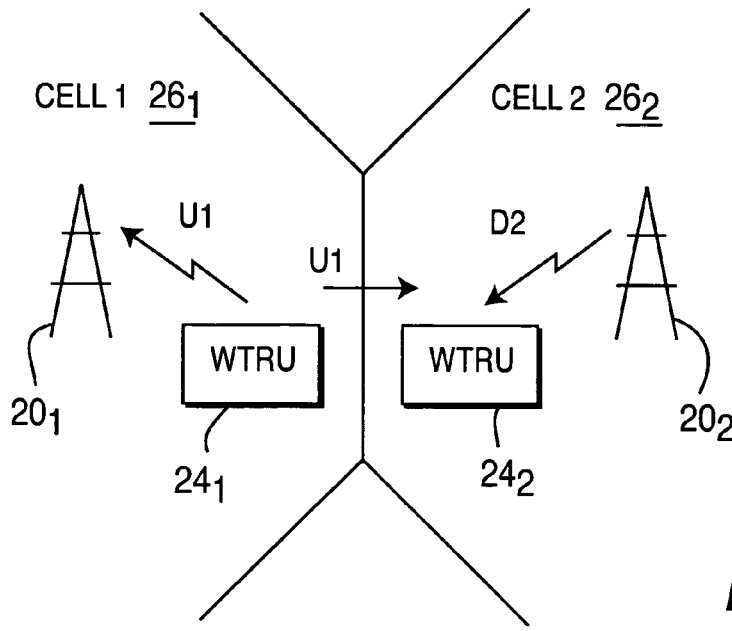
FIG. 1 is an illustration of inter-cellular interference.
Figure 2:
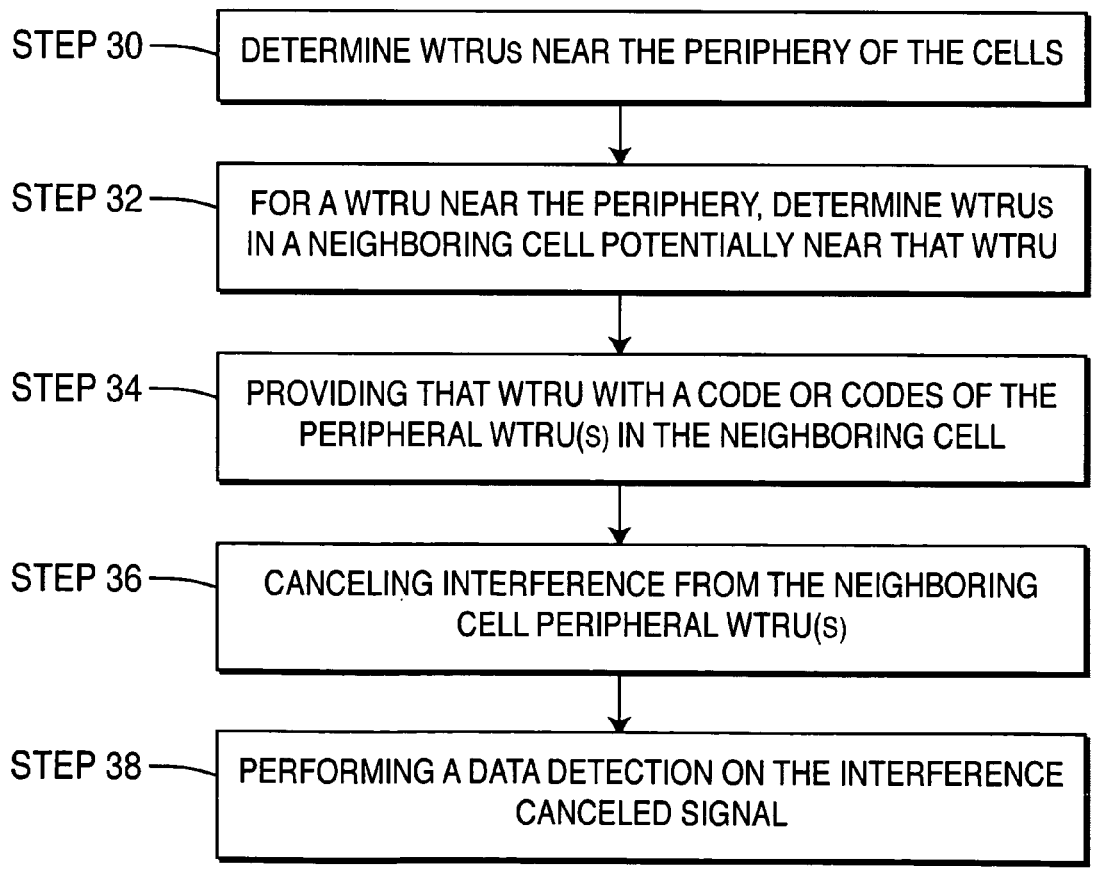
FIG. 2 is a flow chart of inter-cellular interference cancellation.
Figure 3:
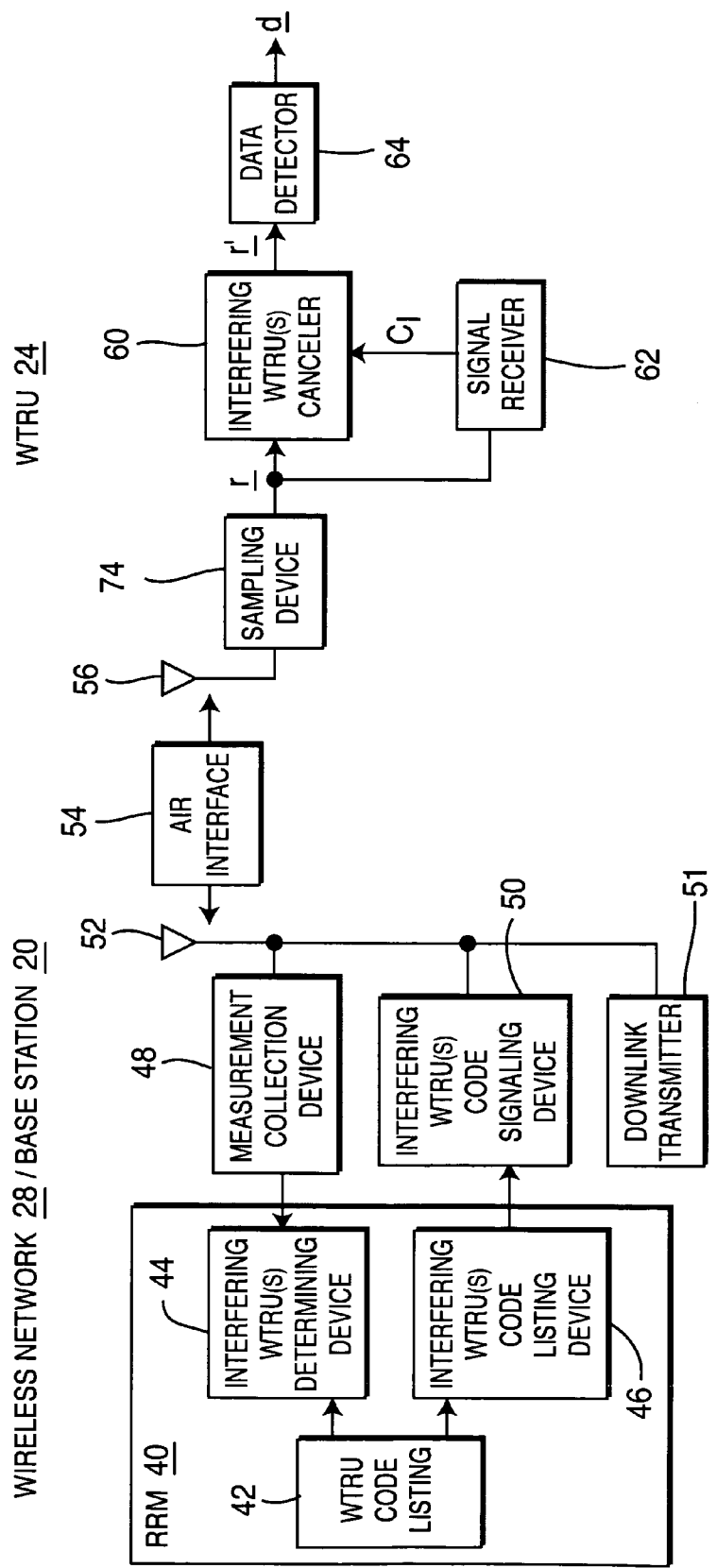
FIG. 3 is a simplified diagram of an embodiment of an inter-cellular interference canceller.

FIG. 2 is a flow chart for inter-cellular interference cancellation and FIG. 3 is a simplified diagram of an embodiment of such a system. Typically, inter-cellular interference cancellation is performed when a WTRU 24 is experiencing high levels of interference, although inter-cellular interference can be employed at lower interference levels as well. One implementation may be in a slotted code division multiple access communication system. In a particular time slot, a WTRU 24 may experience high interference levels and in others it may experience low interference levels. In such a scenario, the high interference in one slot may result from a nearby WTRU 24 in another cell transmitting during that slot.

Initially, WTRUs located at the periphery of cells are determined, step 30. One technique for determining the WTRUs at the cell periphery is by monitoring the power level of the WTRU connections. The WTRUs with the highest transmission power levels are most likely at the periphery of the cell. Also, the pathloss for each WTRU may be used. WTRUs experiencing more losses are more likely to be at the periphery of the cell. Additionally, for WTRUs having geolocation capabilities, such as cellular based or global positioning based systems the location information along with a map of the cells is used to determine WTRUs at the cell periphery.

For a WTRU 24 at the cell periphery, a nearby WTRU or nearby WTRUs in neighboring cells are determined, step 32. One approach to determining nearby WTRUs uses geographic information. For systems using geolocation, WTRUs in close proximity can be determined by comparing their relative positions. In other systems, the sector that each WTRU resides in may be used to determine nearby WTRUs. To illustrate, WTRUs identified to be at the periphery of abutting sectors may interfere with each other.

Another approach uses interference measurements. If a WTRU 24 is experiencing high interference levels in a certain frequency or combination assigned frequency/time slot, WTRUs transmitting in that assigned frequency or assigned frequency/time slot are identified. Additionally, received signal strength measurements, such as received signal code power (RSCP), can be used to identify nearby cells. In one embodiment, only WTRUs from the cell having the highest RSCP measurement are considered, although in other embodiments a group of cells having high RSCP values may be used. Additionally, a combination of these approaches may be used to determine nearby WTRUs.

After identifying the interfering WTRU or WTRUs, the codes used by those WTRUs are listed, step 34. For implementation with a proposed third generation partnership project (3GPP) wideband code division multiple access (W-CDMA) communication system, the listed codes would include both a scrambling and channelization code. The listed codes are signaled to the WTRU. Using these codes, the WTRU cancels the nearby WTRU signal from its received signals, step 36. Using the interference cancelled signal, the WTRU performs a data detection to recover its data, step 38.

By canceling interference from nearby WTRUs, the downlink transmission power level to that WTRU 24 can be kept at a lower power level. As a result, interference to other WTRUs is decreased, increasing the overall capacity of the system.

In FIG. 3, the base station 20/wireless network 28 receives and transmits signals over the air interface 54. A measurement collection device 48 collects measurements taken by the base station 20 and WTRUs 24, such as pathloss, received signal power measurements and interference measurements. The measurements are sent to a radio resource management device 40. An interfering WTRU(s) determining device 44 uses the collected measurements to determine nearby WTRU(s). An interfering WTRU(s) code listing device 46, lists the codes of the nearby WTRUs. A WTRU(s) code signaling device 50 signals these codes to the WTRU 56. A downlink transmitter 51 transmits downlink signals to the WTRU 24 using the antenna 52.

An antenna 56 at the WTRU 24 receives the downlink signals, the interfering WTRU codes and interfering signals. A sampling device 58 samples the received signals producing a received vector, r. A signal receiver 62 recovers the interfering codes, $C_I$. An interfering WTRU(s) canceller cancels the contribution of the interfering WTRU(s) from the received vector, r, producing r'. Using the interference cancelled vector, r', a data detector 64 recovers the data, d, for that WTRU 24.

Figure 4:
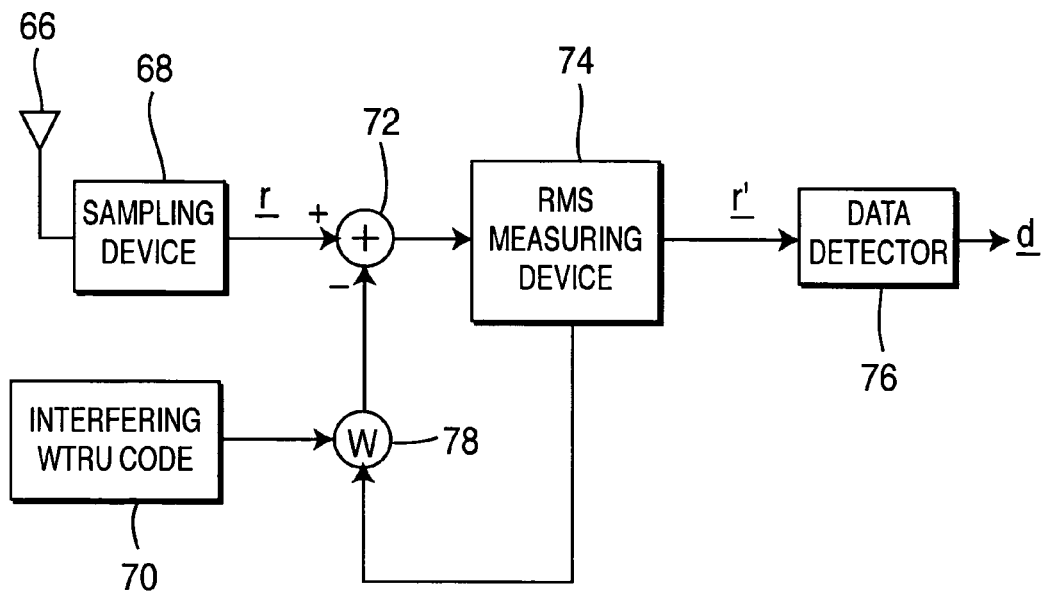
FIGS. 4 and 5 are embodiments of the inter-cellular interference cancellation receiving circuitry.
Figure 5:
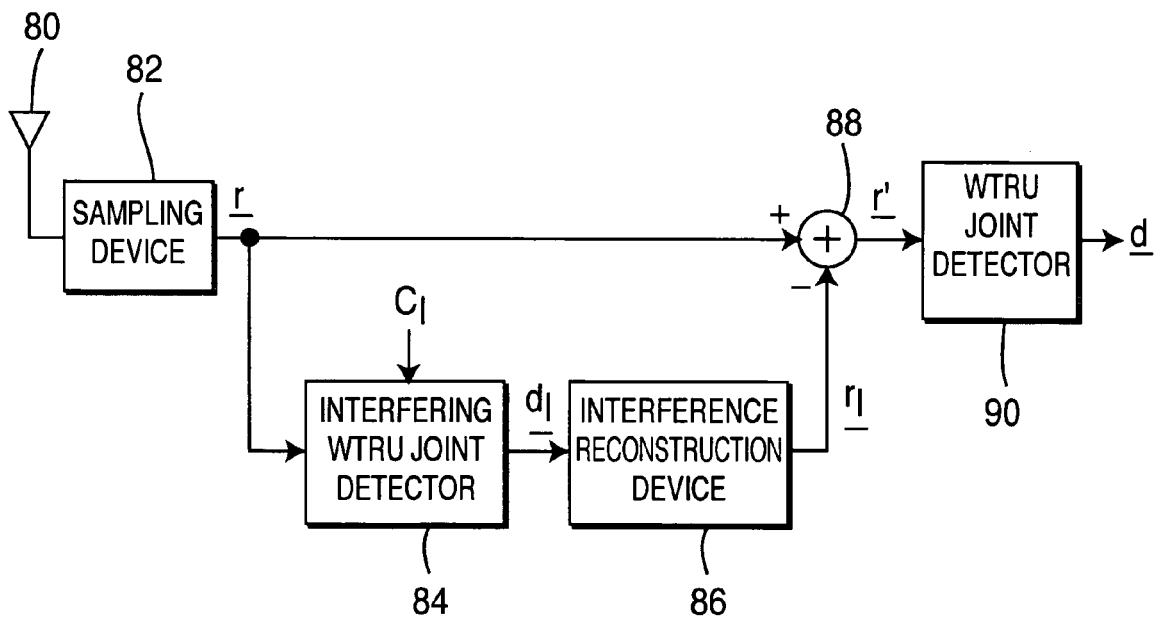

FIGS. 4 and 5 are two embodiments of interference canceling receiving circuits at the WTRU 24. In FIG. 4, signals are received by an antenna 66 and a sampling device 68 samples the received signals producing a received vector, r. A root mean square (RMS) value of the energy of the received signals is measured by an RMS measuring device 74. A code of the interfering WTRU(s), produced by an interfering WTRU code generator 70, is weighted by a weighting device 78 by a value derived from the RMS value, analogous to a Widrow filter. Weights could also be estimated based on known locations. The weighted WTRU code is subtracted by a subtractor 72 from the received vector r, producing a vector, r', having the contribution of the interfering WTRU removed. In the case of Widrow adaptive noise cancellation, the weight is adaptively selected that minimizes the RMS output r' from the RMS measuring device 74. A data detection using a data detector 76, such as a matched filter, SIC, PIC or MUD, is performed on the interference cancelled vector, r', producing a data vector, d.

In FIG. 5, signals are received and sampled by an antenna 80 and a sampling device 82, producing a received vector r. Using the code(s), $C_I$, of the interfering WTRU(s), a joint detection is performed by a joint detector 84 to produce data of the interfering WTRU(s), $d_I$. An interference reconstruction device 86 reconstructs the contribution, $r_I$, of that/those WTRU(s) to the received vector, r. The contribution $r_I$ is subtracted from the received vector, r, by a subtractor 88, producing an interference canceled vector, r'. A joint detector 90 detects the WTRU data, d.

What is claimed is:

1. A wireless transmit/receive unit (WTRU), the WTRU comprising:

an antenna configured to receive signals including a first signal of the WTRU, a second signal of a device other than the WTRU, and a third signal indicating a code of the second signal;

a sampling device configured to sample the first, second and third signals from the antenna and produce a received vector;

a signal receiver configured to determine the second signal code using the received third signal;

an interference canceller configured to cancel the second signal from the received vector, producing an interference canceled signal; and a data detection device having an input configured to receive the interference canceled signal for recovering data of the first signal.

2. The WTRU of claim 1 wherein the interference canceller includes:

a second code generation device configured to produce a code of the second signal;

a weighting device, coupled to a root mean squares (RMS) measuring device, configured to weight the produced code;

a subtractor configured to subtract the weighted produced code from the received signals, producing a subtracted signal;

the RMS measuring device configured to measure a RMS of the subtracted signal; and a data detector having an input configured to receive the subtracted signal for detecting data of the first signal.

3. The WTRU of claim 1 wherein the interference canceller includes;

a second WTRU joint detector configured to detect data of the second signal using the second code;

an interference reconstruction device configured to produce a contribution of the second signal to the received signals;

a subtractor configured to subtract the second signal contribution from the received signals, producing a subtracted signal; and a joint detector having an input configured to receive the subtracted signal and for detecting data of the first signal.

* * * * *

UNITED STATES PATENT AND TRADEMARK OFFICE
CERTIFICATE OF CORRECTION

PATENT NO. : 7,373,128 B2  
APPLICATION NO. : 10/735936  
DATED : May 13, 2008  
INVENTOR(S) : Martin J. Dowling It is certified that error appears in the above-identified patent and that said Letters Patent is hereby corrected as shown below:

IN THE CLAIMS

At claim 1, column 4, line 16, after the words "antenna and", delete "produce" and insert therefor --producing--.

At claim 2, column 4, line 30, after the word "mean", delete "squares" and insert therefor --square--.

Signed and Sealed this

Nineteenth Day of August, 2008

JON W. DUDAS  
*Director of the United States Patent and Trademark Office*